United States Patent [19]

Matsuda et al.

[11] 4,095,986

[45] Jun. 20, 1978

[54] ALKALI-RESISTANT GLASS COMPOSITIONS

[75] Inventors: Osaku Matsuda; Kouzo Inoue; Shuji Tsunematsu, all of Tosu, Japan

[73] Assignee: Director-General of the Agency of Industrial Science and Technology, Tokyo, Japan

[21] Appl. No.: 718,102

[22] Filed: Aug. 27, 1976

[30] Foreign Application Priority Data

Jul. 15, 1976   Japan ............................... 49-8481951

[51] Int. Cl.² .................... C03C 5/04; C03C 13/00; C04B 31/06
[52] U.S. Cl. ............................... 106/52; 106/50; 106/99
[58] Field of Search .................. 106/52, 50, 99

[56] References Cited

U.S. PATENT DOCUMENTS

| 3,736,162 | 5/1973 | Chvalovsky et al. | 106/99 |
| 3,876,481 | 4/1975 | Erickson | 106/50 |

*Primary Examiner*—Winston A. Douglas
*Assistant Examiner*—Mark Bell
*Attorney, Agent, or Firm*—William J. Daniel

[57] ABSTRACT

An alkali-resistant glass composition which comprises 40 – 55% by weight of $SiO_2$, 6 – 12% by weight of $Al_2O_3$, 8 – 30% by weight of CaO, 3 – 6% by weight of an alkali metal oxide of $Na_2O$ and/or $K_2O$, 3 – 10%, by weight of $ZrO_2$ and 2 – 20% by weight of ZnO together with or without 2 – 7% by weight of $Fe_2O_3$. This glass composition has especially remarkable alkali-resistance and is excellent in fusibility, workability, spinnability and devitrification-resistance.

7 Claims, No Drawings

ALKALI-RESISTANT GLASS COMPOSITIONS

BACKGROUND OF THE INVENTION

The present invention relates to a glass composition possessing remarkable alkali-resistance. In general, silicate glass possesses poor alkali-resistance and thus has a defect of being attacked by an alkaline solution. Especially, in case glass fibers with a large specific surface area are used to reinforce such alkaline cementitious products as cement or hydrated calcium silicate, alkali-resistance of the glass fibers is taken up as a very important problem for durability of the fiber-reinforced composite products.

Hitherto, natural asbestos has widely been used as reinforcing fibers for alkaline cementitious products. At present, however, the use of natural asbestos is very strictly limited because its resource is becoming exhausted and its carcinogenicity is strongly suspected in recent years. Under such circumstances, there is a great demand for development of inorganic, non-combustible and alkali-resistant glass fibers capable of being substituted for natural asbestos.

In view of such a severe situation, worldwide extensive research and development of alkali-resistant glass fibers are now being carried out actively and some studies thereon have been reported already. However, glass compositions proposed according to the prior studies have one or more drawbacks including poor alkali-resistance, difficulty in manufacture due to high temperatures required for fusion or fiberization, devitrification and high cost. Up to the present, therefore, none of these prior art glass compositions has been used for the manufacture of glass fibers on a truly commercial basis. Especially from the economical point of view, it is desirable that the starting materials should be supplied in a large amount at a low cost.

As a result of various researches made to solve the various problems referred to above, it has now been found that a specific range of composition capable of affording an extremely high alkali-resistant glass can be obtained by incorporating natural acidic volcanic rocks or volcanic ejecta composed predominantly of aluminum silicate with $ZrO_2$ for enhancing alkali-resistance, CaO for lowering fusing temperature of glass, ZnO especially for preventing devitrification and if necessary $Fe_2O_3$ for enhancing devitrification-resistance, lowering of spinning temperature and alkali-resistance. The present invention has been accomplished on the basis of the above finding.

BRIEF SUMMARY OF THE INVENTION

In accordance with the present invention, there is provided an alkali-resistance glass composition which comprises 40 – 55% by weight of $SiO_2$, 6 – 12% by weight of $Al_2O_3$, 8 – 30% by weight of CaO, 3 – 6% by weight of an alkali metal oxide of $Na_2O$ and/or $K_2O$, 3 – 10% by weight of $ZrO_2$ and 2 – 20% by weight of ZnO together with or without 2 – 7% by weight of $Fe_2O_3$.

It is an object of the present invention to provide an alkali-resistant glass composition which can be manufactured in a large quantity at a low cost by utilizing vitreous acidic volcanic rocks or volcanic ejecta present in an unlimited quantity in nature.

It is another object of the present invention to provide an alkali-resistant glass composition having a fusing temperature suitable for processing.

It is still another object of the present invention to provide an alkali-resistant glass composition which is poor in devitrification and can be colored easily.

It is further object of the present invention to provide a process for the manufacture of an alkali-resistant glass composition of good quality at a low cost and in an industrial scale.

Other and further objects, features and advantages of the invention will appear more fully from the following description.

DETAILED DESCRIPTION OF THE INVENTION

The alkali-resistant glass composition of the present invention is comprised predominantly of (1) the ingredients shown in the following table:

| (1) Chemical ingredient | Amount in percentage by weight |
| --- | --- |
| $SiO_2$ | 40 – 55 |
| $Al_2O_3$ | 6 – 12 |
| CaO | 8 – 30 |
| $Na_2O$ / $K_2O$ | 3 – 6 |
| $ZrO_2$ | 3 – 10 |
| ZnO | 2 – 20 | or (2) the ingredients shown in the above table (1) together with 2 – 7% by weight of $Fe_2O_3$.

In the present invention, alkali-resistance of the glass was determined by dipping a glass sample into an alkaline cement extract containing 3.45 g/l of KOH, 0.88 g/l of NaOH and 0.48 g/l of $Ca(OH)_2$ at 100° C or into a 10% solution of NaOH heated at 100° C and then measuring the amount of the glass sample dissolved in the extract or solution after the lapse of 5 hours, the glass sample having been prepared by cooling a fused glass, pulverizing it and sieving the pulverized glass to collect a fraction having a particle size of 350 – 420 μ. On the other hand, fusibility, workability and spinnability of glass which are taken up as problems in the manufacture of glass or glass fibers were evaluated from viscosities of the glass at various temperatures. A temperature at which the viscosity of the fused glass became 1000 poise was determined as the spinning temperature. The degree of devitrification due to crystallization of the glass was evaluated by visible observation with naked eyes and an X-ray diffraction analysis of the fused and cooled glass samples.

The present invention will now be explained in more detail with reference to the composition of the glass and the effects of the main chemical ingredients.

Among the ingredients constituting the glass composition, $SiO_2$ and $Al_2O_3$ can be supplied by using a material containing such ingredients in large amounts. Industrially, natural acidic volcanic rocks composed predominantly of aluminum silicate, such as andesite, rhyolite, obsidian, perlite, pitchstone, welded tuff, volcanic ejecta and pumice are used effectively. Further, the aforesaid natural acidic volcanic rocks contain an appropriate amount of alkali metal ingredients. In case such volcanic rocks are used, therefore, addition of the alkali metal ingredients is not especially required. The vitreous aluminum silicate materials such as obsidian, perlite and volcanic ejecta are advantageous because they are quickly fused and vitrified. For example, volcanic ejecta or pumice granules deposited in a large quantity in large caldera areas contain as the main ingredients 65 – 73% by weight of $SiO_2$, 12 – 16% by weight of $Al_2O_3$, 1 – 3% by weight of $Fe_2O_3$, 2 – 4% by weight of CaO, 3 – 4% by weight of $Na_2O$ and 2 – 4% by weight of $K_2O$ and are composed, in mineral composition, of about 70% of vitreous substances and about 30% of crystalline substances composed predominantly of feldspar. Accordingly, these volcanic ejecta and pumice can effectively used as a main starting material of the present invention.

If the amount of $SiO_2$ and $Al_2O_3$ which form the skeleton of the vitreous structure is too small, alkali-resistance of the resultant glass will be deteriorated. On the other hand, if the amount is excessively large, fusing temperature and spinning temperature of the resulting glass will be elevated with concurrent deterioration of alkali-resistance. Thus, a proper range of proportion exists for these ingredients and a preferable one is 40 – 55% by weight of $SiO_2$ and 6 – 12% by weight of $Al_2O_3$.

For CaO ingredient, limestone, quick lime and slaked lime can be used. If the proportion of the CaO ingredient is increased, the fusing temperature of the resulting glass will be dropped with concurrent enhancement of alkali-resistance to caustic alkali but deterioration of alkali-resistance to cement extract. A preferable range for the amount of CaO ingredient is 8 – 30% by weight.

For $ZrO_2$ ingredient, a $ZrO_2$-containing mineral such as zircon sand may be employed. If the amount of the $ZrO_2$ ingredient is increased, alkali-resistance of the resultant glass against the above mentioned two types of alkali will certainly be enhanced but concurrent elevation of fusing and spinning temperatures of the glass will require a higher temperature. As the $ZrO_2$ ingredient tends to cause devitrification of the glass, a preferable range of the $ZrO_2$ is 3 – 10% by weight.

For ZnO ingredient, a ZnO-containing mineral may also be used. The ZnO ingredient serves to drop the fusing and spinning temperatures and moreover plays an important role in preventing the glass of this invention from devitrification. If the amount of ZnO ingredient becomes larger, resistance to caustic alkali will be deteriorated but resistance to cement extract will remarkably be enhanced. Thus, a preferable range of the ZnO ingredient is 2 – 20% by weight.

Increase in the amount of $Fe_2O_3$ ingredient intensifies the color of the resultant glass but an amount of the $Fe_2O_3$ ingredient within a range of 2 – 7% by weight is effective for lowering the working and spinning temperature of the glass, enhancing the alkali-resistance and preventing devitrification. Thus, the $Fe_2O_3$ ingredient in an amount within the aforementioned range may be added, if necessary, or alternatively a material having a high content of $Fe_2O_3$ may be used in such an amount that the amount of the $Fe_2O_3$ ingredient contained may be within the aforementioned range.

The alkali-resistant glass composition of the present invention is manufactured generally by mixing in a given mixing ratio the acidic vitreous volcanic rock or the volcanic ejecta with CaO, $ZnO_2$, ZnO and, if necessary, $Fe_2O_3$, fusing the mixture and heating it, if necessary, up to about 1500° C.

The glass of the present invention is excellent in fusibility and spinnability and can be used for manufacturing alkali-resistant glass fibers or glass products easily therefrom.

To further illustrate this invention, and not by way of limitation, the following examples are given. Example 1

To 64.8 parts by weight of volcanic ejecta from Shinjo district of Tarumi city, Kagoshima Pref., Japan (usually called "Shirasu") which contains 72.7% by weight of $SiO_2$, 13.7% by wight of $Al_2O_3$, 1.8% by weight of $Fe_2O_3$, 1.4% by weight of CaO, 0.2% by weight of MgO, 3.46% by weight of $Na_2O$ and 3.42% by weight of $K_2O$ were added 9.3 parts by weight of CaO, 7.4 parts by weight of $ZrO_2$ and 18.5 parts by weight of ZnO. The mixture was fused at 1500° C and quickly cooled by pouring it into water to form cullet which was again fused at 1500° C and cooled by spreading it on an iron panel. After complete removal of any attached iron, the glass was pulverized in a mortar and sieved to collect glass particles of 350 – 420 μ in size which were then thoroughly washed with distilled water and ethyl alcohol to remove very fine fragments whereby a glass sample for examining alkali-resistance was obtained. This glass sample was composed of 47.1% of $SiO_2$, 8.9% of $Al_2O_3$, 1.2% of $Fe_2O_3$, 10.2% of CaO, 0.1% of MgO, 2.2% of $Na_2O$, 2.2% of $K_2O$, 7.4% of $ZrO_2$ and 18.5% of ZnO, the all percentages being by weight.

A 10% NaOH solution and a cement extract prepared by mixing 3.45 g/l of KOH, 0.88 g/l of NaOH and 0.48 g/l of $Ca(OH)_2$ were used as alkaline solutions for examining alkali-resistance of the glass sample. In a Pyrex container with a lid were placed 200 ml of the alkaline solution. The alkaline solution was heated to 100° C in a water bath and about 1 g of the glass sample was weighed precisely, added to the alkaline solution and stirred with a stirring rod at a time interval of one hour. After 5 hours, the alkaline solution was cooled and filtered with a glass filter and a solid particles on the filter were thoroughly washed several times with distilled water and then with acetone, and dried. The amount of the glass dissolved was calculated by precisely weighing the amount of the insoluble particles remaining on the filter. The values obtained were respectively an average value of 4 measurements.

The cullet was fused in an electric furnace and a temperature-viscosity correlation curve between 1200° C and 1400° C was obtained by using a platinum ball-lifting type viscosimeter. A temperature at which the viscosity was 1000 poise was determined as spinning temperature.

The amount of glass dissolved in alkali was 2.65% in the case of 10% NaOH and 0.01% in the case of the cement extract. These results prove that alkali-resistance of the glass sample was excellent. The spinning temperature of the sample was 1267° C. Devitrification-resistance of the sample was found excellent.

(COMPARATIVE EXAMPLE)

For the purpose of comparison with the glass composition of the present invention, alkali-resistance of commercially available glass was measured in the same manner as described in Example 1. A result of the measurement is shown in Table 1.

Table 1

| Sort of glass | Amount of glass dissolved (%) | |
|---|---|---|
| | Cement extract | 10% NaOH |
| Ordinary glass panel 1 | 1.50 | 9.91 |
| Ordinary glass panel 2 | 1.42 | 9.12 |
| Non-alkali glass 1 | 0.84 | 5.32 |
| Non-alkali glass 2 | 0.82 | 4.56 |

. It is evident from the result that as compared with the glass described in Example 1, each commercially available glass is easily attacked by alkali.

EXAMPLE 2

Measurement of alkali-resistance and spinning temperature was carried out in a similar manner for glass samples containing the same volcanic ejecta as described in Example 1 in various mixing ratios. A result of the measurement is shown in Table 2. To make constant the surface area of each glass sample to be subjected to the measurement of alkali-resistance, the specific gravity of each glass sample was measured by using a pycnometer and each glass sample was weighed in a proportional amount to its specific gravity, arbitrarily defining one gram of a glass sample having a specific gravity of 2.90 as standard weight.

Table 2

| Mixing ratio (% by weight) | | | | Amount of glass dessolved (%) | | Spinning temperature (° C) |
|---|---|---|---|---|---|---|
| Volcanic ejecta | CaO | $ZrO_2$ | ZnO | Cement extract | 10% NaOH | |
| 66.0 | 14.2 | 5.7 | 14.1 | 0.02 | 2.44 | 1238 |
| 66.0 | 18.9 | 5.7 | 9.4 | 0.13 | 2.25 | 1247 |
| 64.8 | 19.6 | 7.4 | 8.2 | 0.03 | 1.25 | 1251 |
| 64.8 | 23.1 | 7.4 | 4.7 | 0.20 | 1.38 | 1222 |
| 64.8 | 13.9 | 10.0 | 11.3 | 0 | 0.50 | 1255 |
| 68.5 | 17.2 | 5.7 | 8.6 | 0.06 | 1.01 | 1260 |
| 70.5 | 15.9 | 5.7 | 7.9 | 0.16 | 2.64 | 1292 |

Table 2 obviously shows that the glass samples with the above chemical compositions are extremely small in the amount dissolved in 10% NaOH and the cement extract and are much more alkali-resistant than the commercially available glass samples shown in Table 1. The glass samples of the present invention had a spinning temperature of at most 1292° C which corresponds to the spinning temperature of a commercially available glass possessing poor alkali-resistance. The glass samples of the present invention were excellent also in devitrification resistance.

EXAMPLE 3

Measurement of alkali-resistance and spinning temperature was carried out in the same manner as described in Example 1 for glass samples prepared by mixing CaO, $ZrO_2$ and ZnO ingredients with perlite from Arita-cho district in Saga Pref., Japan which comprises 74.7% of $SiO_2$, 12.5% of $Al_2O_3$, 0.7% of $Fe_2O_3$, 0.3% of CaO, 0.1% of MgO, 3.5% of $Na_2O$ and 4.0% of $K_2O$, the all percentage being by weight, or with welded tuff from Minamisekimachi District in Kumamoto Pref., Japan which comprises 67.7% of $SiO_2$, 15.6% of $Al_2O_3$, 2.1% of $Fe_2O_3$, 1.1% of CaO, 0.5% of MgO, 3.5% of $Na_2O$ and 3.7% of $K_2O$, the all percentage being by weight. A result of the measurement is shown in Table 3.

Table 3

| Mixing ratio (% by weight) | | | | Amount of glass dissolved (%) | | Spinning temperature (° C) |
|---|---|---|---|---|---|---|
| Rock | CaO | $ZrO_2$ | ZnO | Cement extract | 10% NaOH | |
| Perlite 66.0 | 18.9 | 5.7 | 9.4 | 0.17 | 2.74 | 1245 |
| Welded tuff 64.8 | 13.9 | 7.4 | 13.9 | 0.07 | 1.85 | 1250 |

As is evident from Table 3, the above glass samples are excellent in alkali-resistance as in the case of those prepared from the volcanic ejecta in Examples 1 and 2. In addition, the above glass samples are low enough in spinning temperature and excellent in devitrification-resistance.

EXAMPLE 4

Using the same volcanic ejecta as described in Example 1, the effect of $Fe_2O_3$ was examined under a similar condition. A result of the examination is shown in Table 4.

Table 4

| Exp. No. | Mixing ratio (% by weight) | | | | | Amount of glass dissolved (%) | | Spinning temperature (° C) |
|---|---|---|---|---|---|---|---|---|
| | Volcanic ejecta | CaO | $ZrO_2$ | ZnO | $Fe_2O_3$ | Cement extract | 10% NaOH | |
| 1 | 67.3 | 19.8 | 3.3 | 9.6 | — | — | 4.42 | 1245 |
| 2 | 66.0 | 19.4 | 3.3 | 9.4 | 1.9 | — | 4.24 | 1215 |
| 3 | 64.8 | 18.9 | 3.3 | 9.3 | 3.7 | — | 3.83 | 1188 |
| 4 | 63.6 | 18.5 | 3.3 | 9.1 | 5.5 | — | 3.46 | 1158 |
| 5 | 62.5 | 18.2 | 3.3 | 8.9 | 7.1 | — | 4.61 | 1168 |
| 6 | 64.8 | 18.5 | 7.4 | 9.3 | — | 0.23 | 2.69 | 1250 |
| 7 | 63.6 | 18.2 | 7.3 | 9.1 | 1.8 | 0.17 | 2.60 | 1214 |
| 8 | 62.5 | 17.9 | 7.1 | 8.9 | 3.6 | 0.20 | 2.51 | 1190 |
| 9 | 61.4 | 17.5 | 7.0 | 8.8 | 5.3 | 0.21 | 2.46 | 1160 |
| 10 | 60.3 | 17.2 | 6.9 | 8.6 | 7.0 | 0.29 | 3.05 | 1169 |
| 11 | 64.8 | 23.1 | 7.4 | 4.7 | — | — | 1.50 | 1224 |
| 12 | 63.6 | 22.7 | 7.3 | 4.6 | 1.8 | — | 1.41 | 1188 |
| 13 | 62.5 | 22.3 | 7.1 | 4.5 | 3.6 | — | 1.34 | 1161 |
| 14 | 61.5 | 21.8 | 7.0 | 4.4 | 5.3 | — | 1.17 | 1130 |
| 15 | 60.5 | 21.5 | 6.8 | 4.3 | 6.9 | — | 1.96 | 1140 |

It is understood from Table 4 that as the amount of $Fe_2O_3$ added is gradually increased, alkali-resistance to caustic alkali and to the cement extract is enhanced with concurrent lowering of spinning temperature. However, when the amount of $Fe_2O_3$ is increased from about 5.5% by weight to about 7% by weight, the above mentioned tendency is reversed. It is desirable therefore that the $Fe_2O_3$ ingredient is used in an amount less than 7% by weight. The glass samples in the above experiments were all excellent in devitrification-resistance.

What is claimed is:

1. An alkali-resistant glass composition consisting essentially of 40 – 55% by weight of $SiO_2$, 6 – 12% by weight of $Al_2O_3$, 8 – 30% by weight of CaO, 3 – 6% by weight of an alkali metal oxide, 3 – 10% by weight of $ZrO_2$, 2 – 20% by weight of ZnO and optionally 2 – 7% by weight of $Fe_2O_3$.

2. An alkali-resistant glass composition according to claim 1 which consists essentially of 40 –55% by weight of $SiO_2$, 7 – 12% by weight of $Al_2O_3$, 9 – 30% by weight of caO, 3 – 6% by weight of an alkali metal oxide, 3 – 10% by weight of $ZrO_2$ and 2 – 20% by weight of ZnO.

3. An alkali-resistant glass composition according to claim 1 which consists essentially of 40 – 55% by weight of $SiO_2$, 6 – 12% by weight of $Al_2O_3$, 2 – 7% by weight of $Fe_2O_3$, 8 – 30% by weight of CaO, 3 – 6% by weight of an alkali metal oxide, 3 – 10% by weight of $ZrO_2$ and 2 – 20% by weight of ZnO.

4. an alkali-resistant glass composition according to claim 1 wherein said alkali metal oxide is a combination of $Na_2O$ and $K_2O$.

5. A process for the manufacture of an alkali-resistant glass composition, characterized by incorporating 60 – 73% by weight of acidic vitreous volcanic rocks or volcanic ejecta with 8 – 26% by weight of CaO, 3 – 10% by weight of $ZrO_2$ and 2 – 20% by weight of ZnO, and thereafter fusing the mixture to produce the alkali-resistant glass composition of claim 1.

6. A process according to claim 5 wherein said acidic vitreous volcanic rocks or volcanic ejecta are composed essentially of 65 – 73% by weight of $SiO_2$, 12 – 16% by weight of $Al_2O_3$, 1 – 3% by weight of $Fe_2O_3$, 2 – 4% by weight of CaO, 3 – 4% by weight of $Na_2O$ and 2 – 4% by weight of $K_2O$.

7. A process according to claim 5 wherein said acidic vitreous volcanic rocks or volcanic ejecta are at least one selected from the group consisting of, rhyolite, obsidian, perlite, pitchstone, welded tuff, Shirasu and pumice.

* * * * *

UNITED STATES PATENT OFFICE
CERTIFICATE OF CORRECTION

Patent No. 4,095,986        Dated June 20, 1978

Inventor(s) Osaku Matsuda et al

It is certified that error appears in the above-identified patent and that said Letters Patent are hereby corrected as shown below:

<u>In the Heading:</u>

Foreign Application Priority Data, Item [30], should read:

-- Jul. 15, 1976     Japan ............. 51-84819 --.

<u>In the Claims:</u>

Column 6, line 63, "caO" should read -- CaO --.

Signed and Sealed this

Fourteenth Day of November 1978

[SEAL]

Attest:

RUTH C. MASON
Attesting Officer

DONALD W. BANNER
Commissioner of Patents and Trademarks